(12) United States Patent
Akatsu et al.

(10) Patent No.: US 7,974,866 B2
(45) Date of Patent: Jul. 5, 2011

(54) SYSTEM AND METHOD FOR MANAGING WORKFLOW AMONG A PLURALITY OF BUSINESS PROCESSES ASSOCIATED RESPECTIVELY WITH USERS HAVING ACCESS RIGHTS TO ARTIFACTS

(75) Inventors: Hiroyuki Akatsu, Tokyo (JP); Kenji Eda, Yasu (JP); Yo Murai, Tokyo (JP); Teruaki Okano, Kawasaki (JP); Yasuharu Yada, Kusatsu (JP); Masao Yamada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 11/776,151

(22) Filed: Jul. 11, 2007

(65) Prior Publication Data

US 2008/0052144 A1 Feb. 28, 2008

(30) Foreign Application Priority Data

Jul. 14, 2006 (JP) ................... 2006-194140

(51) Int. Cl.
*G06Q 10/00* (2006.01)
(52) U.S. Cl. ....................... 705/7.27; 705/1.1
(58) Field of Classification Search .............. 705/7.27
See application file for complete search history.

(56) References Cited

U.S. PATENT DOCUMENTS

| | | | | |
|---|---|---|---|---|
| 7,570,943 B2 * | 8/2009 | Sorvari et al. | ............ | 455/414.1 |
| 2004/0015367 A1 * | 1/2004 | Nicastro et al. | ............ | 705/1 |
| 2004/0030992 A1 * | 2/2004 | Moisa et al. | ............ | 715/513 |
| 2005/0283416 A1 * | 12/2005 | Reid et al. | ............ | 705/35 |
| 2006/0235831 A1 * | 10/2006 | Adinolfi et al. | ............ | 707/3 |

FOREIGN PATENT DOCUMENTS

| | | |
|---|---|---|
| JP | 08-190587 | 7/1996 |
| JP | 2001-188865 | 7/2001 |
| JP | 2002-073708 | 12/2002 |
| JP | 2004-362043 | 12/2004 |
| JP | 2005-078438 | 3/2005 |

OTHER PUBLICATIONS

JPO, Information Materials for IDS, Japanese Office Action date Apr. 1, 2008.

* cited by examiner

*Primary Examiner* — Lynda C Jasmin
*Assistant Examiner* — Thomas Mansfield
(74) *Attorney, Agent, or Firm* — Shimokaji & Associates, P.C.

(57) ABSTRACT

A system and method for managing a workflow are provided. A system for managing a workflow in accordance with an embodiment of the invention includes: a storage unit for storing, as an access history for each of at least one artifact, identification information of a business process that has accessed the artifact; a request reception unit for receiving an access request to an artifact from a user; a first notification unit for retrieving an access history corresponding to a first artifact from the storage unit on a condition that a first access request received from the user corresponding to a first business process is an update request of the first artifact, and for notifying a user corresponding to the business process that is identified in the retrieved access history that the first artifact is to be updated; and a history adding unit for adding identification information of the first business process to the access history corresponding to the first artifact in response to an accessing of the first artifact based on the first access request.

2 Claims, 8 Drawing Sheets

FIG. 1

| ARTIFACT | | | OWNER (BUSINESS PROCESS) | RELATION | ACCESS HISTORY |
|---|---|---|---|---|---|
| ARTIFACT ID | VALUE | MATURITY INDEX | | | |
| RPT | 60 | MATURE | 1 | ≥XX+10 | (5,CREATION),(3,REFERENCE),(1,UPDATE)... |
| FLOW ID | EKF01 | IMMATURE | 1 | — | (5,CREATION),(4,REFERENCE),(1,UPDATE)... |
| ... | ... | ... | ... | ... | ... |
| SPEC ID | N/A | IMMATURE | 2 | ≤YY | (2,APPLICATION,RPT)... |
| ... | ... | ... | ... | ... | ... |
| XX | 50 | IMMATURE | 3 | <RPT-10 | (3,CREATION) |
| YY | 20 | IMMATURE | 5 | <SPEC ID | (5,CREATION) |
| ... | ... | ... | ... | ... | ... |

SYSTEM AND METHOD FOR MANAGING WORKFLOW AMONG A PLURALITY OF BUSINESS PROCESSES ASSOCIATED RESPECTIVELY WITH USERS HAVING ACCESS RIGHTS TO ARTIFACTS

FIELD OF THE INVENTION

The present invention relates to a system and method for managing a workflow. More particularly, the present invention relates to a system and method for managing a workflow among a plurality of business processes.

BACKGROUND ART

Conventionally, an IPO framework is used for designing a workflow between business processes. The IPO framework defines each business process as a set of IPO (INPUT/PROCESS/OUTPUT). The relation between one business process and another business process that uses the OUTPUT of the one business process as its INPUT is defined as an upstream/downstream relation, to create a flowchart. This makes it possible to accurately understand the dependence relation between the business processes.

Japanese Unexamined Patent Publication (Kokai) No. 2002-73708 describes a system that applies the IPO framework. The system automatically determines progress of a job based on workflow definition data prepared in advance, and a part table of the parts produced in respective steps.

Recently, in the semiconductor and other manufacturing industries, there are market demands to reduce the time of delivery and save cost, while the designing and producing processes become more and more complicated. In order to respond to such demands, it is desirable to make a plurality of business processes cooperate efficiently. With the conventional IPO framework, however, it is not assumed that a plurality of business processes depending on one another would be processed in parallel. Thus, even in the case where a downstream business process can be started during the processing of an upstream business process, the downstream business process would have to be started only after completion of the upstream business process. Further, it is presumed that any artifact would be transferred from an upstream business process to a downstream business process, and no function has been provided for arbitration between updates of the artifacts (deliverables) by a plurality of business processes. Furthermore, the workflow would be defined in advance by a manager or the like, with no presumption of dynamic update of the workflow.

In view of the foregoing, there is a need for a solution to these and other deficiencies of the related art.

SUMMARY OF THE INVENTION

The present invention provides a system and method for managing a workflow among a plurality of business processes associated respectively with users having access rights to artifacts.

A first aspect of the present invention is directed to a system for managing a workflow among a plurality of business processes associated respectively with users having access rights to artifacts, comprising: a storage unit for storing, as an access history for each of at least one artifact, identification information of a business process that has accessed the artifact; a request reception unit for receiving an access request to an artifact from a user; a first notification unit for retrieving an access history corresponding to a first artifact from the storage unit on a condition that a first access request received from the user corresponding to a first business process is an update request of the first artifact, and for notifying a user corresponding to the business process that is identified in the retrieved access history that the first artifact is to be updated; and a history adding unit for adding identification information of the first business process to the access history corresponding to the first artifact in response to an accessing of the first artifact based on the first access request.

A second aspect of the present invention is directed to a method for managing a workflow among a plurality of business processes associated respectively with users having access rights to artifacts, comprising: storing, as an access history for each of at least one artifact, identification information of a business process that has accessed the artifact; receiving an access request to an artifact from a user; retrieving an access history corresponding to a first artifact from storage on a condition that a first access request received from the user corresponding to a first business process is an update request of the first artifact, and notifying a user corresponding to the business process that is identified in the retrieved access history that the first artifact is to be updated; and adding identification information of the first business process to the access history corresponding to the first artifact in response to an accessing of the first artifact based on the first access request.

A third aspect of the present invention is directed to a program product stored on a computer readable medium, which when executed, manages a workflow among a plurality of business processes associated respectively with users having access rights to artifacts, the computer readable medium comprising program code for: storing, as an access history for each of at least one artifact, identification information of a business process that has accessed the artifact; receiving an access request to an artifact from a user; retrieving an access history corresponding to a first artifact from storage on a condition that a first access request received from the user corresponding to a first business process is an update request of the first artifact, and notifying a user corresponding to the business process that is identified in the retrieved access history that the first artifact is to be updated; and adding identification information of the first business process to the access history corresponding to the first artifact in response to an accessing of the first artifact based on the first access request.

According to the present invention, it is possible to ensure efficient progress of a plurality of business processes that depend on one another.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION OF THE INVENTION

Figure 1:
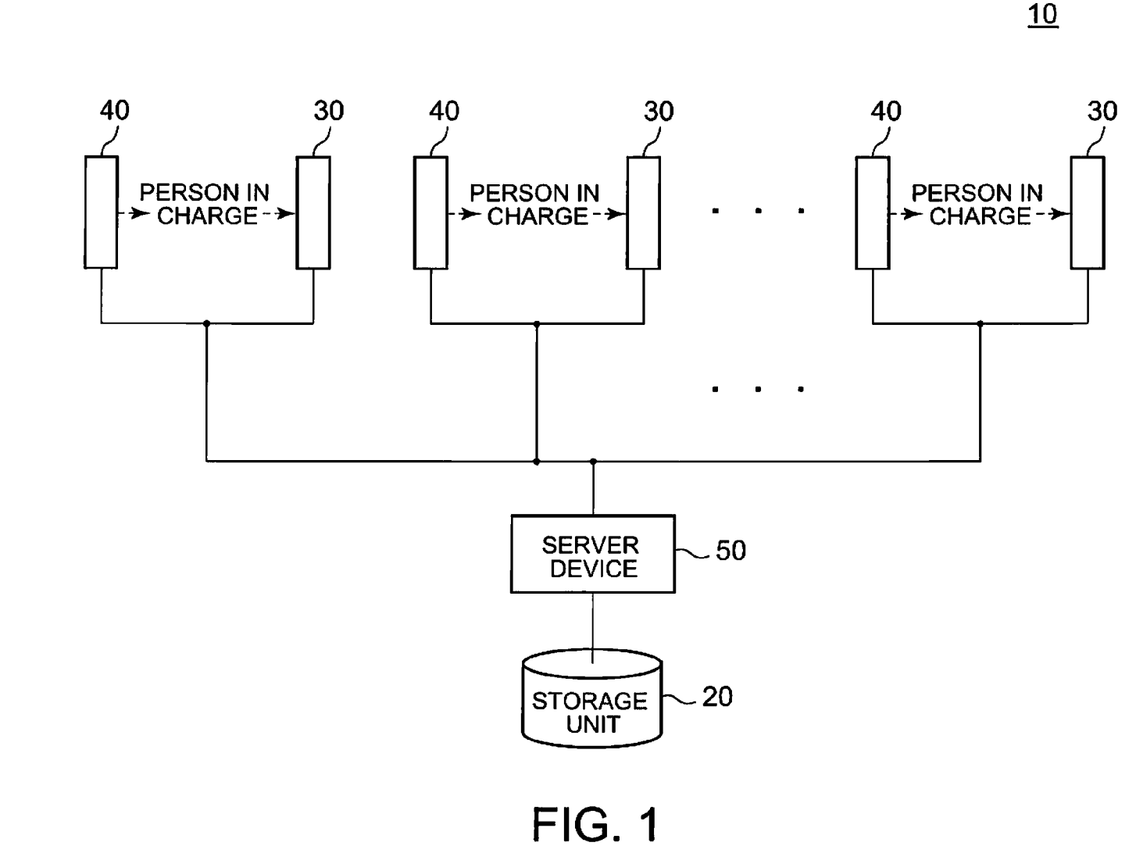
FIG. 1 shows an overall configuration of a management system in accordance with an embodiment of the present invention.

FIG. 1 shows an overall configuration of a management system 10. The management system 10 is a system that manages a workflow among a plurality of business processes. The management system 10 includes a storage unit 20, a server device 50, a plurality of output control units 30 provided corresponding to persons in charge of respective business processes, and a plurality of input control units 40 provided corresponding to the persons in charge of the respective business processes. The storage unit 20 stores, as an access history for each of at least one artifact, identification information of the business process the user corresponding to which has accessed the relevant artifact.

A plurality of business processes are associated respectively with users who have access rights to artifacts of the business processes. Hereinafter, the user corresponding to a certain business process is referred to as the person in charge of the relevant business process. The business process is a procedure for creating at least one agreement as an artifact as a result of negotiation and/or investigation. The business process may be an engineering process for creating design information or specification of an article as a result of research and development. The artifact refers to a resultant object generated through a given business process. The artifact includes, not only the resultant object produced by completion of a business process, but also an intermediate product produced during the business process. The artifact corresponds to data that can be stored in the storage unit 20. Specifically, the artifact may be design data generated by a person in charge, or designer, or may be a matter determined by a person in charge, or manager. Further, a common artifact may be referred to or updated concurrently by a plurality of business processes.

The output control units 30 and the input control units 40 each receive an access request to a given artifact from the corresponding person in charge of the business process. In the case where the access request is an update request, the output control unit 30 notifies other persons who formerly referred to the artifact that the artifact is to be updated. This allows the person in charge of any business process that depends on the artifact before update to appropriately recognize necessities of redo or modification of the process. In the case where the access request is a reference request, the input control unit 40 reads the artifact from the storage unit 20 and outputs the same to the person in charge. In either case, the server device 50 adds, to the access history stored in the storage unit 20 in association with the artifact, the identification information of the business process the person in charge of which has accessed the artifact.

Further, the input control units 40 may each determine whether the maturity index of the artifact for which reference has been requested satisfies a predetermined criterion. The maturity index refers to an index value indicating how close to the finished state the artifact is, for example. The maturity index may indicate how low the probability is that the artifact will be modified in design afterwards. If the maturity index of the artifact satisfies the criterion, the input control unit 40 outputs the artifact to the person in charge.

As described above, the management system 10 according to the present embodiment sends a notification, on the conditions of an access request from a person in charge and update of the artifact, to a person in charge of any business process that may suffer inconsistency based thereon. This is done for the purpose of maintaining consistency as a whole of a plurality of business processes even in the case where the persons in charge of the respective business processes proceed with the operations simultaneously and concurrently with no definition made for the overall workflow in advance.

Figure 2A:
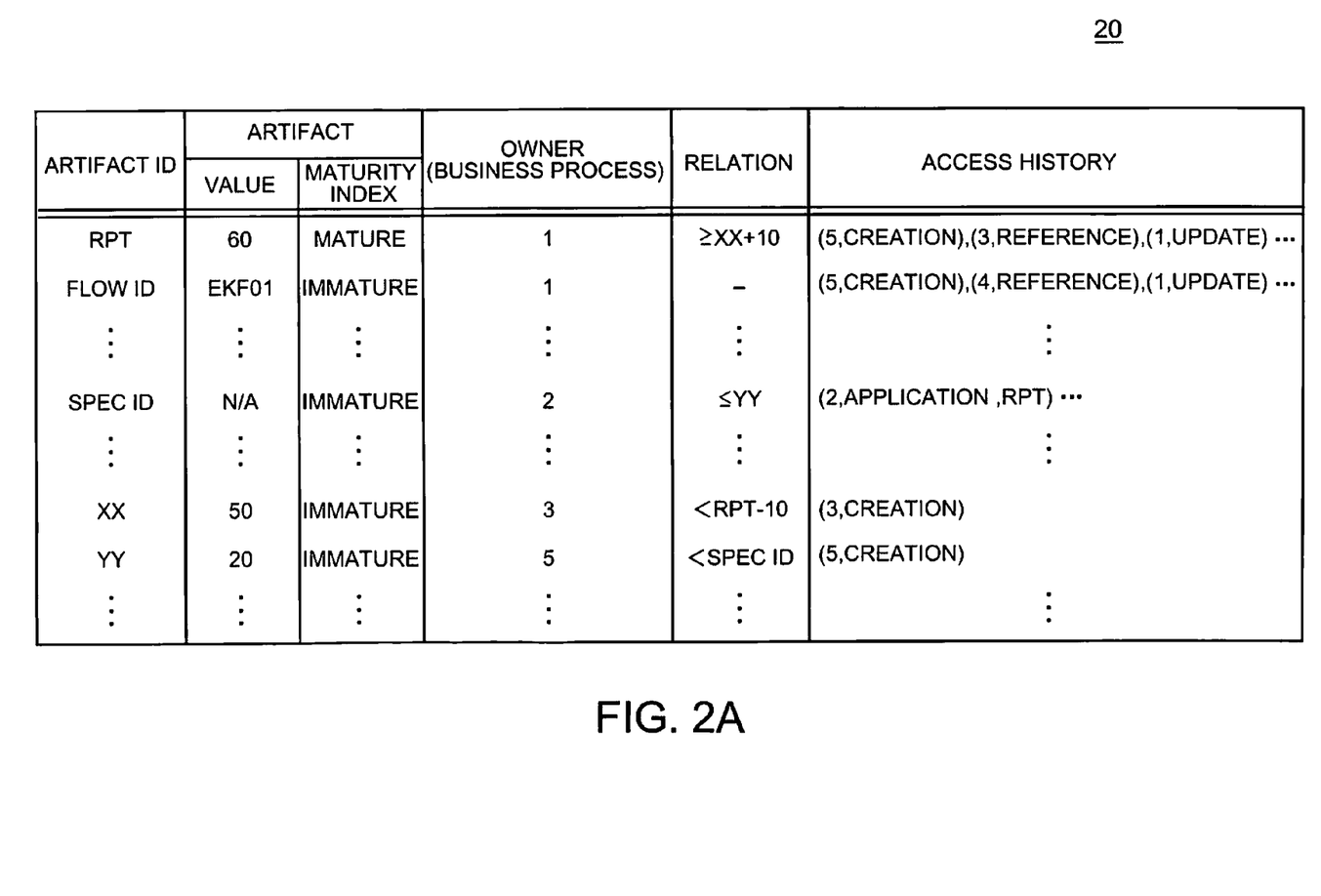
FIG. 2A shows an example of a data structure of a storage unit in accordance with an embodiment of the present invention.

FIG. 2A shows an example of a data structure of the storage unit 20. The storage unit 20 stores, for each of a plurality of artifacts, an artifact ID for identification of the artifact, the content of the artifact, the owner of the artifact, a relation that the artifact should satisfy with another artifact, and the access history for the artifact. Specifically, as shown by way of example in FIG. 2A, the storage unit 20 stores a value "60" as the content of the artifact, and "mature" as the maturity index of the artifact, in association with "RPT" as the ID of the artifact. As such, the content of the artifact may be data of a numerical value. The maturity index of the artifact may be a representation in natural language indicating the degree of maturity, or may be a numerical value (a percentage with respect to 100%, for example) indicating the degree of maturity.

The storage unit 20 further stores, in association with the artifact, the business process 1 as the owner of the artifact. The owner of an artifact refers to a person in charge who has updated the artifact most recently. The person who has most recently updated the artifact corresponds to the person in charge who made the latest update in the case where update has been done more than once, and the person in charge who created the artifact in the case where no update has been done yet. In the example shown in FIG. 2A, the person who has most recently updated the artifact "RPT" is the person in charge of the business process 1. Further, the storage unit 20 stores, in association with the artifact "RPT", a relation the artifact "RPT" should satisfy with the artifact "XX". The relation is that the artifact "RPT" as an integer value is greater than the artifact "XX" as an integer value by 10 or more. At the current point, the artifact "RPT" takes an integer value of "60", while the artifact "XX" takes an integer value of "50", so that the relevant relation is satisfied. It is noted that the "relation" is inputted, for example, upon creation of an artifact by a person in charge of creating the artifact, and is received by a request reception unit 300 (FIG. 3) in an output control unit 30, which will be described later, and then stored in the storage unit 20.

The storage unit 20 further stores, in association with the artifact "RPT", the identification information of any business process the person in charge of which has accessed the artifact "RPT", as the access history. According to the access history shown by way of example in FIG. 2A, the artifact "RPT" has been accessed by the business process 5, the business process 3, and the business process 1, in this order. As the access history of each artifact, the storage unit 20 preferably further stores an attribute indicating which one of "reference", "update" and "creation" the access made by a person in charge corresponds to, in association with the identification information of the business process the person in charge of which has accessed the artifact. According to the access history shown in FIG. 2A, the artifact "RPT" has been created by the person in charge of the business process 5, referred to by the person in charge of the business process 3, and thereafter, updated by the person in charge of the business process 1.

Further, the storage unit 20 stores, as the access history of each artifact, another artifact that has been referred to by a person in charge in order to create the relevant artifact. For example, the person in charge of the business process 2 refers to the artifact "RPT" upon creation of the artifact "SpecID". Thus, the storage unit 20 stores the business process 2 and "application" as its attribute, in association with the artifact "SpecID". The storage unit 20 also stores the artifact "RPT" that has been referred to in order to create the artifact "SpecID", in association with the relevant attribute. Herein, "application" is the attribute indicating that an artifact was applied when creating another artifact, which is a kind of the attribute of "creation".

Further, a plurality of artifacts may be owned by a common business process, as shown in FIG. 2A. For example, the artifact "RPT" and the artifact "FlowID" are owned by the business process 1. As such, the correspondence between the business process and the artifact is not necessarily one for one.

Figure 2B:
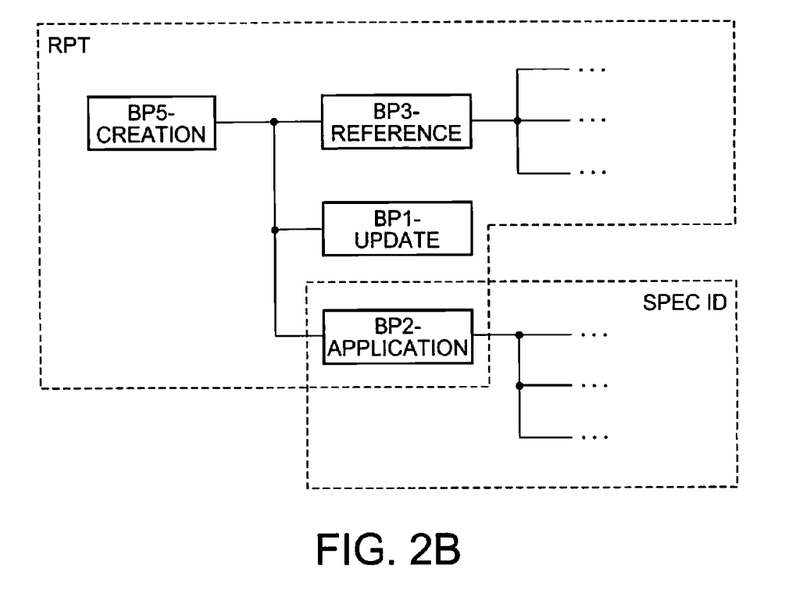
FIG. 2B shows a flow of data among the business processes based on the example shown in FIG. 2A in accordance with an embodiment of the present invention.

FIG. 2B shows a flow of data among the business processes based on the example shown in FIG. 2A. In FIG. 2B, the business processes are indicated by nodes, and the relations where the artifacts created or updated by the respective business processes are referred to by other business processes are shown as links in the graph. Specifically, the artifact "RPT" created by the business process 5 is referred to by the business process 3, and then referred to by other business processes. Further, this artifact is updated by the business process 1. Still further, this artifact is referred to by the business process 2, in order to create the artifact "SpecID". The artifact "SpecID" created by the business process 2 is further referred to by other business processes.

Figure 3:
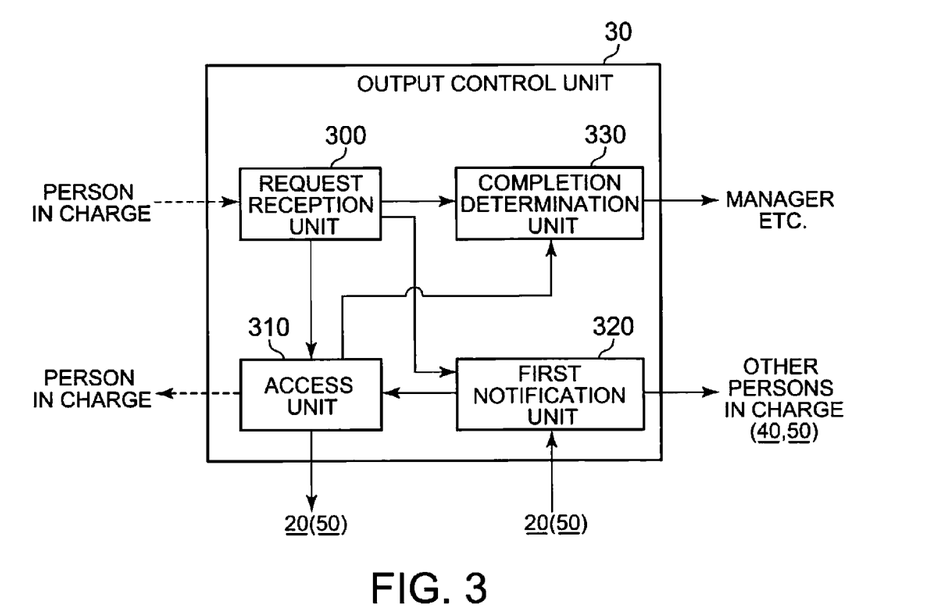
FIG. 3 shows a functional configuration of an output control unit in accordance with an embodiment of the present invention.

FIG. 3 shows a functional configuration of the output control unit 30, which is provided corresponding to a person in charge of a certain business process (referred to as the "first business process"). The other output control units 30 are essentially identical to the output control unit 30 shown in FIG. 3, except that they are provided corresponding to the other persons, so that description thereof will not be repeated. The output control unit 30 has a request reception unit 300, an access unit 310, a first notification unit 320, and a completion determination unit 330. The request reception unit 300 functions as the request reception unit according to the present invention, together with a request reception unit 400 which will be described later, with reference to FIG. 4.

The request reception unit 300 receives an access request to an artifact from a person in charge of a given business process. In the example shown in FIG. 3, the request reception unit 300 receives an access request only from the corresponding person. Alternatively, the request reception unit 300 may be provided in the server device 50 or the like, in which case it may receive an access request from any person in charge.

The access unit 310 updates the artifact in the storage unit 20 in accordance with the received access request. The access to the artifact may be carried out by the server device 50. Further, upon update of the artifact, the access unit 310 may convert the artifact presented by the person in charge to a data format suitable for storage in the storage unit 20. The first notification unit 320, on the condition that a first access request received from the person in charge of the first business process is an update request of the first artifact, retrieves the access history corresponding to the first artifact from the storage unit 20. The first notification unit 320 then notifies the person in charge of any business process the identification information of which is included in the retrieved access history that the first artifact is to be updated. The destination of notification (for example, an electronic mail address of each person in charge) and the ID of the business process included in the history are associated with each other in advance, and the first notification unit 320 may detect the destination of notification of each person in charge based on such association.

The completion determination unit 330 determines whether, as a result of update of the artifact in response to an update request or a creation request, a condition for completing the corresponding business process is satisfied. Specifically, the completion determination unit 330 reads from the storage unit 20 the maturity index of each of a plurality of artifacts created by the business process. The completion determination unit 330 may determine whether each of the read maturity indices satisfies a predetermined condition. If the condition is satisfied, the artifacts are outputted to the manager or the like. Further, the completion determination unit 330 may store the artifacts in a database for finished products (not shown).

Figure 4:
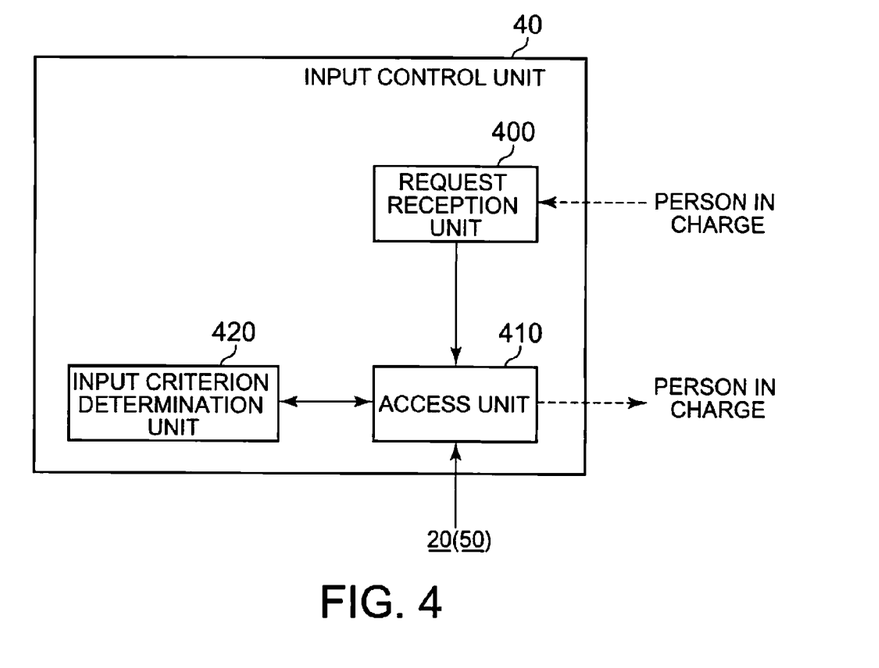
FIG. 4 shows a functional configuration of an input control unit in accordance with an embodiment of the present invention.

FIG. 4 shows a functional configuration of the input control unit 40, provided corresponding to a person in charge of a certain business process (referred to as the "first business process"). The other input control units 40 are essentially identical to the input control unit 40 shown in FIG. 4, except that they are provided corresponding to the other persons, so that description thereof will not be repeated. The input control unit 40 has a request reception unit 400, an access unit 410, and an input criterion determination unit 420. The request reception unit 400 functions as the request reception unit according to the present invention, together with the request reception unit 300 described above. The request reception unit 400 receives an access request to the first artifact from the person in charge of the first business process. In response to the access request, the access unit 410 reads from the storage unit 20 a value of the maturity index, in association with the maturity index. In this case, the access unit 410 may modify each artifact read from the storage unit 20 to the data format that can readily be used by the person in charge.

Further, the request reception unit 400 may retrieve a necessary artifact from the storage unit 20, in accordance with a request from the person in charge. The retrieval may be done in accordance with match of the keyword, or match of the artifact ID. If a necessary artifact cannot be retrieved, the request reception unit 400 may send to all or some of the other persons in charge a message inquiring whether he/she has created or is about to create the necessary artifact. If the necessary artifact has been retrieved, the request reception unit 400 reads the value of the retrieved artifact and its maturity index from the storage unit 20.

The input criterion determination unit 420 determines whether the maturity index of each of the read artifacts satisfies a predetermined criterion. Here, it is configured such that a person in charge can freely set this criterion, thereby making it possible to start a downstream process without the need to wait for completion of the upstream process. The access unit 410 outputs to the person in charge any artifact having the maturity index satisfying the criterion. The access unit 410 may monitor the storage unit 20 and read the maturity index at regular intervals, to determine whether the maturity index satisfies the criterion on a regular basis.

Figure 5:
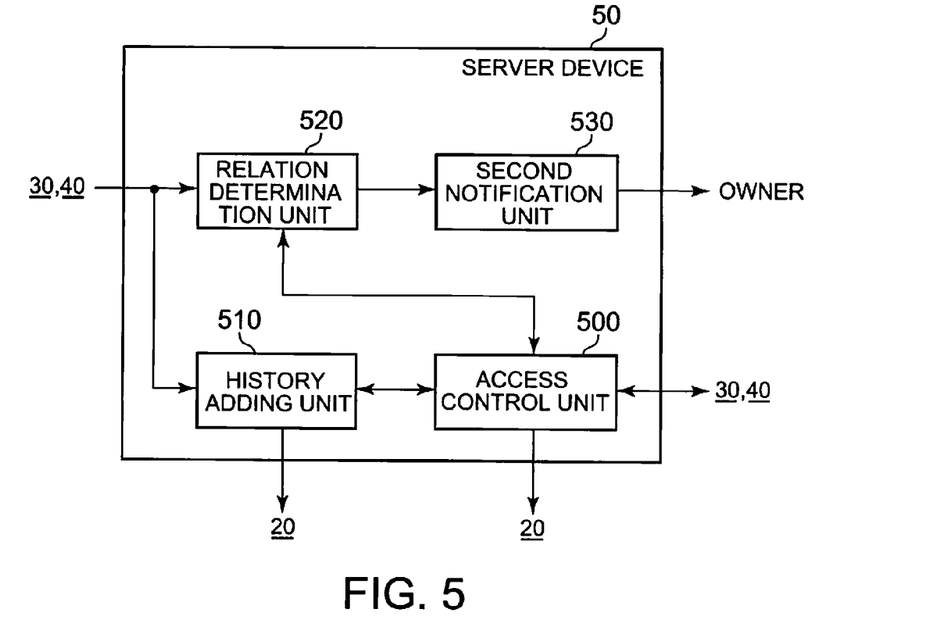
FIG. 5 shows a functional configuration of a server device in accordance with an embodiment of the present invention.

FIG. 5 shows a functional configuration of the server device 50. The server device 50 has an access control unit 500, a history adding unit 510, a relation determination unit 520, and a second notification unit 530. The access control unit 500 accesses the storage unit 20 in response to an instruction received from the request reception unit 300 or the request reception unit 400, and returns the result to the request reception unit 300 or the request reception unit 400. The access control unit 500 may further access the storage unit 20 based on an instruction from the history adding unit 510 or the relation determination unit 520. The history adding unit 510, in response to the event that the artifact (for example, the first artifact) has been accessed based on the access request (for example, the first access request) received by the request reception unit 300 or the request reception unit 400, adds the identification information of the first business process to the access history stored in association with the first artifact.

The relation determination unit 520, on the condition that the first access request received from the person in charge of the first business process is an update request of the first artifact, determines whether the artifact after the update satisfies the relation with the second artifact that is stored in association with the first artifact. That is, the relation determination unit 520 reads the relation stored in association with the first artifact from the storage unit 20 in response to the update request, and reads the value of the second artifact that is referred to in that relation. It then determines whether the value of the first artifact after the update and the value of the second artifact satisfy the relevant relation. In the example of the artifact "RPT" in FIG. 2, when the value of "RPT" is updated, the relation determination unit 520 determines whether the value is greater than the value of "XX" by 10 or more. If the first artifact after the update does not satisfy the relation, the second notification unit 530 notifies at least one of the owner of the first artifact and the owner of the second artifact that the relevant relation is not satisfied.

Figure 6:
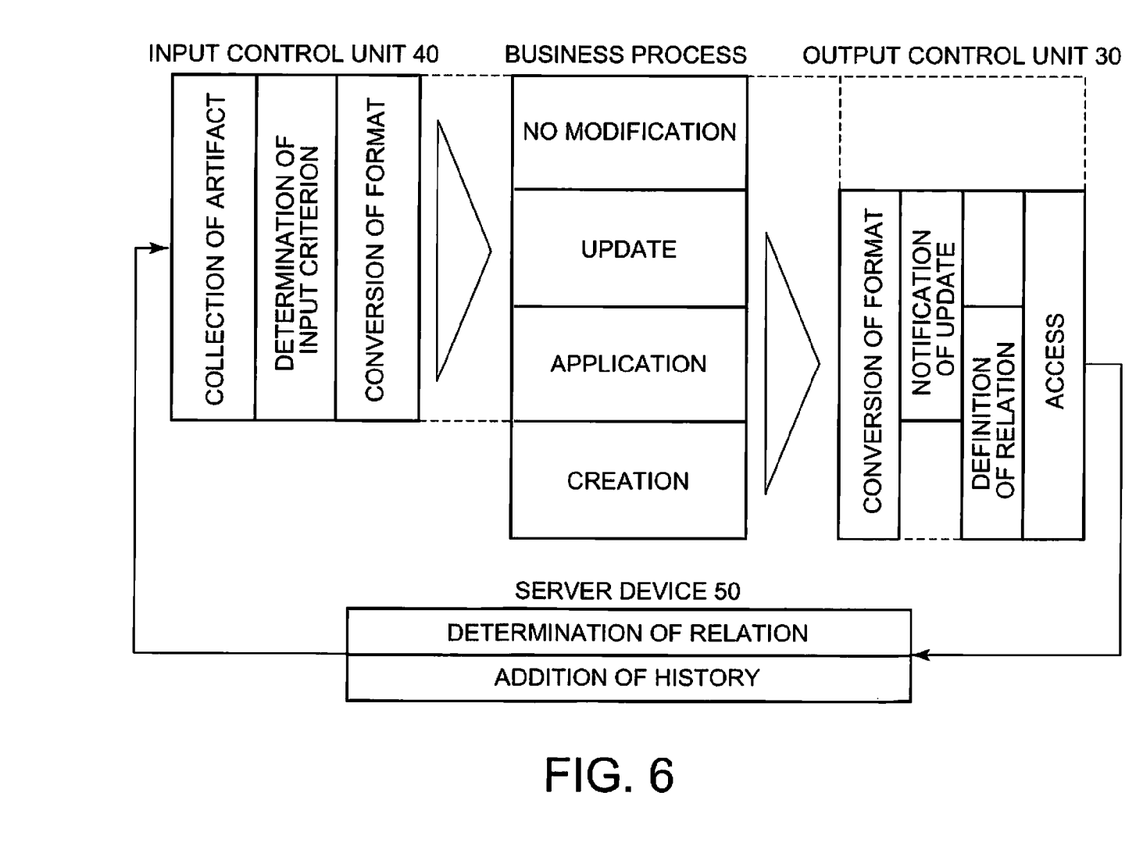
FIG. 6 is a conceptual diagram of the processing carried out by the output control unit, the input control unit, and the server device in accordance with an embodiment of the present invention.

FIG. 6 is a conceptual diagram illustrating the processing carried out by the output control unit 30, the input control unit 40 and the server device 50. When receiving an access request to a given artifact, the input control unit 40 reads the artifact from the storage unit 20. In the case where the artifact is not stored in the storage unit 20, the input control unit 40 may send an inquiry of the artifact to other persons (collection of the artifact). The input control unit 40 determines whether the maturity index of the read artifact satisfies a predetermined input criterion (determination of the input criterion). If it satisfies the criterion, the input control unit 40 converts the data format of the read artifact to the format suitable for use by the person in charge before outputting (conversion of the format). In the case where the access request is a reference request, the artifact is maintained as it is. In the case where the access request is an update request, the processing of the output control unit 30 is started for either update or creation of the artifact.

The output control unit 30 converts the artifact presented by the person in charge to the data format suitable for storage in the storage unit 20 (conversion of the format). If the first access request received from the person in charge of the first business process is an update request of the first artifact, the output control unit 30 retrieves the access history corresponding to the first artifact from the storage unit 20. The output control unit 30 then notifies the person in charge of any business process whose identification information is included in the retrieved access history that the first artifact is to be updated (notification of the update).

On the other hand, if the first access request is a request to create the first artifact, the request reception unit 300 receives input of the first artifact and the relation that should be satisfied between the first artifact and a second artifact. The storage unit 20 stores the received relation (definition of the relation). The access unit 310 then accesses the storage unit 20 in accordance with the first access request (access).

Figure 7:
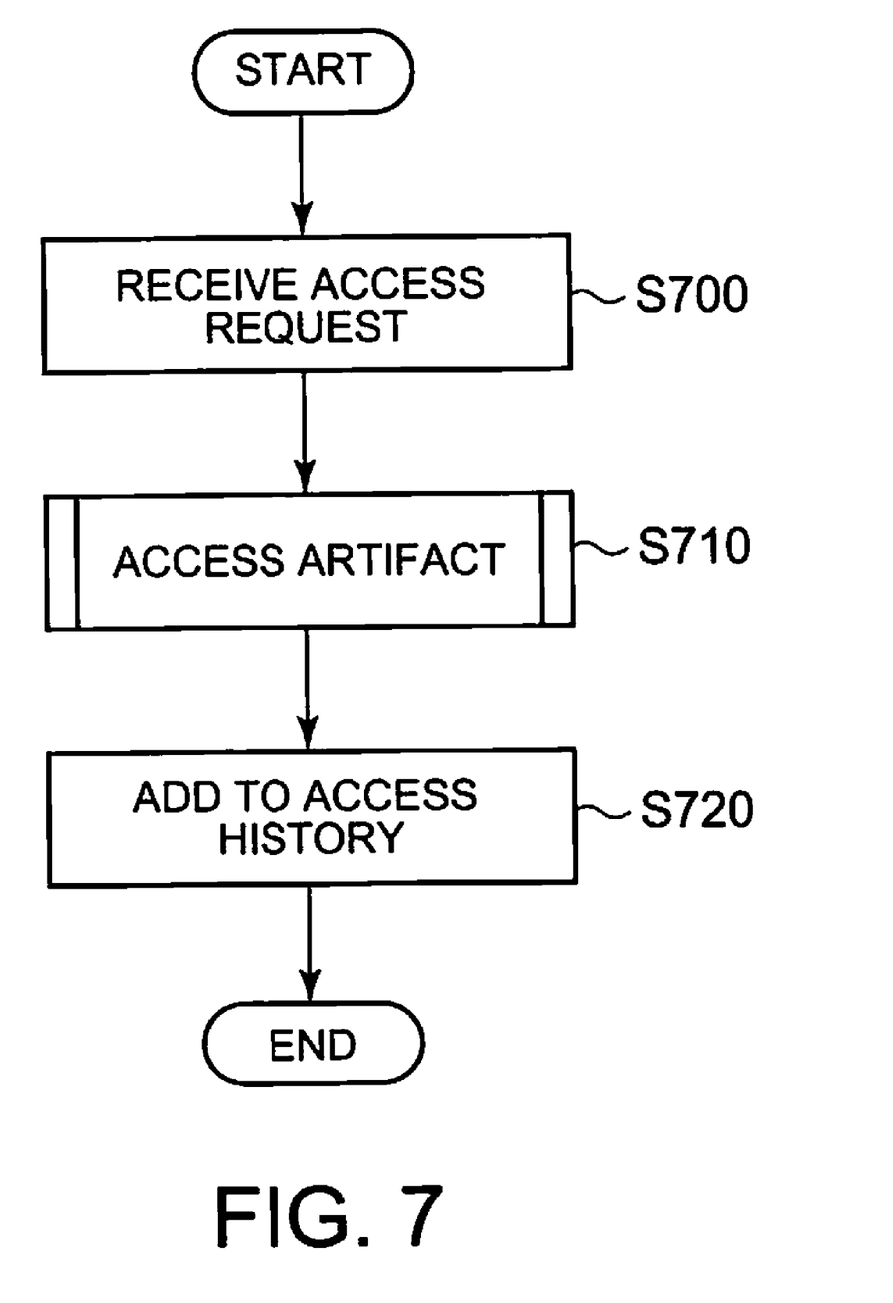
FIG. 7 shows a flow of the processing carried out by the management system in accordance with an embodiment of the present invention.

FIG. 7 shows a flow of the processing carried out by the management system 10. The request reception unit 300 and the request reception unit 400 each receive an access request to a given artifact from a person in charge of a given business process (S700). The output control unit 30 and the input control unit 40 each access the artifact in accordance with the access request, while executing various processes (S710). In response to the event that the artifact has been accessed, the history adding unit 510 adds to the access history corresponding to the artifact, the identification information of the business process the person in charge of which has accessed the artifact (S720). As such, whether the artifact is referred to or updated based on the received access request, the history adding unit 510 adds the identification information of the business process the person in charge of which has accessed the artifact to the access history stored in the storage unit 20 in association with the relevant artifact.

Figure 8:
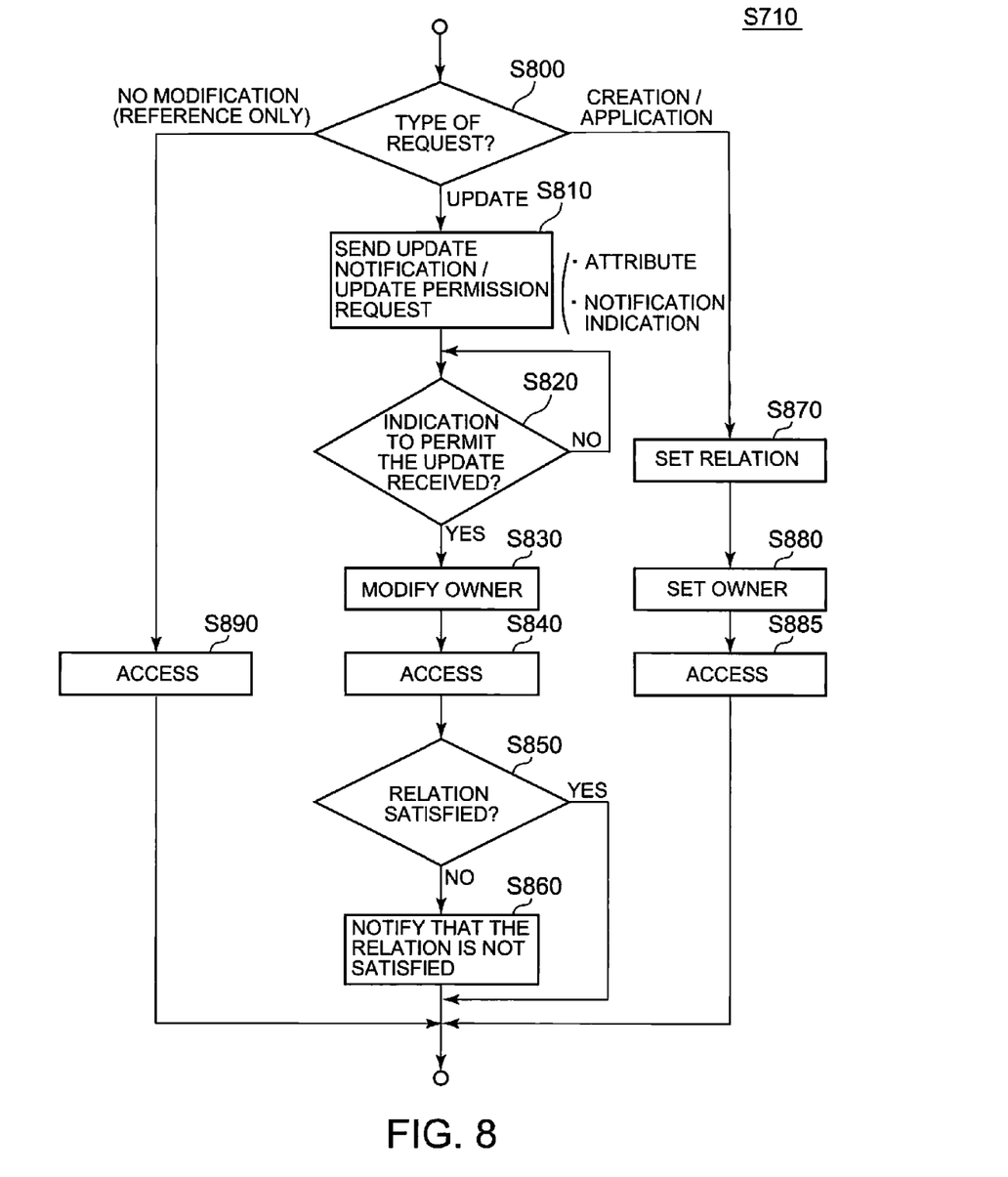
FIG. 8 shows details of the process in S710 in FIG. 7 in accordance with an embodiment of the present invention.

FIG. 8 shows details of the process in S170 of FIG. 7. The request reception unit 300 and the request reception unit 400 each determine the type of the access request (in this figure, assumed to be the "second access request") received from a business process (assumed to be the "second business process") (S800). On the condition that the second access request is a reference request (S800: no modification (reference only)), the access unit 410 refers to the artifact in the storage unit 20 (S890). On the condition that the second access request is creation of a second artifact (including creation by referring to another artifact), the request reception unit 300 sets a condition that the second artifact should satisfy in relation with the other artifact, based on an instruction of the person in charge (S870). In this case, the request reception unit 300 may further receive, in association with an access request to a given artifact, a notification indication showing which one of an update notification and an update permission request is wished to be received when the relevant artifact is to be updated in another business process. The request reception unit 300 causes the storage unit 20 to store the identification information of the second business process as the identification information of the business process the person in charge of which has most recently accessed the artifact (S880). The access unit 310 then accesses the artifact in the storage unit 20 (S885).

On the condition that the second access request is an update request of the first artifact that has already been stored, the first notification unit 320 retrieves the access history corresponding to the first artifact. The first notification unit 320 then sends an update notification or an update permission request to the person in charge of any business process the identification information of which is included in the retrieved access history (S810).

The update notification or the update permission request may be sent distinctively in the following manner. The first notification unit 320 reads the attribute stored in association with each business process included in the access history. The attribute indicates which one of "reference", "update" and "creation" the access to the artifact corresponds to, as described above with reference to FIG. 2. The first notification unit 320 sends an update notification to the person in charge of the business process corresponding to the attribute of "reference". The first notification unit 320 sends an update permission request to the person in charge of the business process corresponding to the attribute of "update" or "creation".

Alternatively, the update notification or the update permission request may be selected based on the notification indication explained in S870. Namely, the request reception unit 300 receives in advance, in association with the access request to an artifact, the notification indication showing which one of the update notification and the update permission request is wished to be received at the time when the relevant artifact is to be updated in another business process. Then, on the condition that the second access request received from the person in charge of the second business process is the update request of the first artifact, the first notification unit 320 selects and sends to the person in charge of the first business process either the update notification or the update permission request based on the notification indication received from the first business process.

It is noted that the update notification or the update permission request may be propagated in a transitive manner via the attribute of "application" of the artifact. That is, the first notification unit 320 may retrieve from the access history stored in the storage unit 20 the second artifact that has been referred to for creating the first artifact for which the access was requested, and further send the update notification or the update permission request to the person in charge of any business process the identification information of which is stored in association with the retrieved second artifact. Taking the artifact "SpecID" in FIG. 2 by way of example, the artifact "RPT" has been referred to for creation of "SpecID", and thus, upon update of "SpecID", the update notification or the like is also sent to the person in charge of any business process that has accessed "RPT".

In the case where the update permission request has been sent, on the condition that an indication to permit the update is received from every destination of the request (S820: YES), the access unit 310 causes the storage unit 20 to store the identification information of the second business process as the identification information of the business process the person in charge of which has mostly recently accessed the artifact, prior to update of the first artifact (S830). The access unit 310 then updates the first artifact (S840). Subsequently, the relation determination unit 520 determines whether the first artifact after the update satisfies the relation stored in association with the artifact (S850). If the relation is not satisfied, the second notification unit 530 reads from the storage unit 20 the IDs of the business processes the persons in charge of which have most recently accessed the respective artifacts, and notifies the persons in charge of the business processes that the relation is not satisfied (S860).

Figure 9:
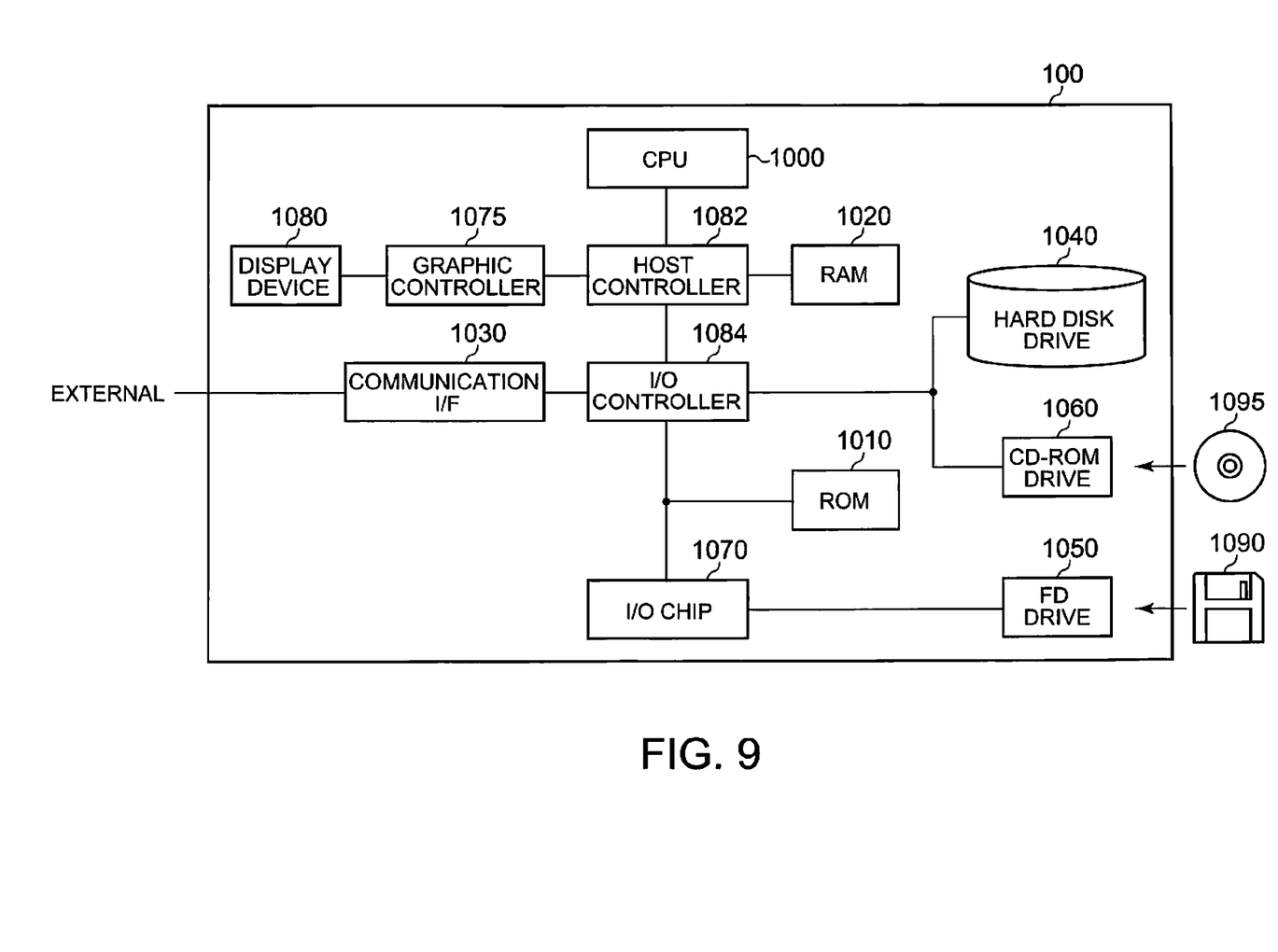
FIG. 9 shows an example of a hardware configuration of an information processing apparatus serving as the output control unit, the input control unit, or the server device in accordance with an embodiment of the present invention.

FIG. 9 shows an example of a hardware configuration of an information processing apparatus 100 that functions as the output control unit 30, the input control unit 40 or the server device 50. The information processing apparatus 100 is provided with: a CPU peripheral unit having a CPU 1000, a RAM 1020 and a graphic controller 1075, which are connected to each other via a host controller 1082; an input/output unit having a communication interface 1030, a hard disk drive 1040 and a CD-ROM drive 1060, which are connected to the host controller 1082 via an input/output controller 1084; and a legacy input/output unit having a ROM 1010, a flexible disk drive 1050 and an input/output chip 1070, which are connected to the input/output controller 1084.

The host controller 1082 connects the RAM 1020 with the CPU 1000 and the graphic controller 1075, which access the RAM 1020 at a high transfer rate. The CPU 1000 operates based on the programs stored in the ROM 1010 and the RAM 1020 to control the units. The graphic controller 1075 acquires the image data generated by the CPU 1000 and the like on a frame buffer provided in the RAM 1020, and displays the same on a display device 1080. Alternatively, the graphic controller 1075 may include therein a frame buffer that stores the image data generated by the CPU 1000 and the like.

The input/output controller 1084 connects the host controller 1082 with the communication interface 1030, the hard disk drive 1040 and the CD-ROM drive 1060, which are relatively high-speed input/output devices. The communication interface 1030 communicates with an external device via a network. The hard disk drive 1040 stores programs and data used by the information processing apparatus 100. The CD-ROM drive 1060 reads a program or data from a CD-ROM 1095, and provides the same to the RAM 1020 or the hard disk drive 1040.

The input/output controller 1084 is also connected with the ROM 1010, and with the flexible disk drive 1050 and the input/output chip 1070, which are relatively low-speed input/output devices. The ROM 1010 stores a boot program executed by the CPU 1000 upon activation of the information processing apparatus 100, and a program that depends on the hardware of the information processing apparatus 100. The flexible disk drive 1050 reads a program or data from a flexible disk 1090, and provides the same to the RAM 1020 or the hard disk drive 1040 via the input/output chip 1070. The input/output chip 1070 connects various input/output devices via the flexible disk 1090 or a parallel port, serial port, keyboard port, mouse port and the like.

The program provided to the information processing apparatus 100 is stored in a recording medium such as the flexible disk 1090, the CD-ROM 1095 or an IC card, and is provided by the user. The program is read from the recording medium via the input/output chip 1070 and/or the input/output controller 1084, and installed to the information processing apparatus 100 for execution. The operation that the program causes the information processing apparatus 100 to execute is identical to the operation of the output control unit 30, the input control unit 40 or the server device 50 explained with reference to FIGS. 1 through 8, and thus, description thereof will not be repeated.

The program as described above may be stored in an external storage medium. The storage medium may be, besides the flexible disk 1090 and the CD-ROM 1095, an optical recording medium such as a DVD or PD, a magneto-optical recording medium such as an MD, a tape medium, or a semiconductor memory such as an IC card. Further, the storage device such as a hard disk or a RAM provided in a server system connected to a dedicated communication network or the Internet may be used as the recording medium, in which case the program may be provided to the information processing apparatus 100 via the network.

As described above in the present embodiment, the management system 10, on the condition of update of an artifact, notifies the person in charge of any business process that may suffer inconsistency based thereon. Further, as a result of the update of the artifact, if there is any relation that is no longer satisfied with another artifact, the management system 10 notifies every one of the persons in charge who have most recently updated the respective artifacts. This makes it possible to maintain consistency as a whole of a plurality of business processes, even in the case where the persons in charge of the respective processes proceed with the operations simultaneously and concurrently with no definition made for the overall workflow in advance, by notifying the respective persons in charge every time the inconsistency may occur.

While the present invention has been described above in conjunction with the embodiment, the technical scope of the present invention is not restricted to the scope of description of the embodiment above. It is apparent for a person skilled in the art that various modifications or improvements are possible for the above-described embodiment. It is evident from the description of the scope of the claims for patent that such modified or improved embodiments may be included in the technical scope of the present invention.

The invention claimed is:

1. A computer-implemented method for managing a workflow among a plurality of business processes associated respectively with a first user of a plurality of users having access rights to artifacts by an information processing apparatus, comprising:
   an input control step of reading a first maturity index, the reading occurring by the information processing apparatus,
   wherein the information processing apparatus includes a computer with a computer processor;
   a first storage step of storing in a storage unit, as an access history for a first artifact, identification information of:
      a first business process that has accessed the first artifact by the first user and an attribute indicating an access type, with the access type including one of a reference access of the first artifact, an update access to update the first artifact and a create access to create the first artifact;
   a second storage step of storing in the first artifact an intermediate product produced during the first business process and storing in the first artifact a resultant object produced by the completion of the first business process;
   a request reception step of receiving a first access request from the first user regarding accessing the first artifact;
   an inquiry step of sending an inquiry of the first artifact to other persons on condition that the first artifact is not stored in the storage unit;
      an updating step of updating the first artifact with the person that has most recently accessed the first artifact;
      a converting step of converting a data format of the first artifact to a format specified by the first user on condition the first maturity index satisfies a predetermined input criterion, wherein when the first access request is a reference request to refer to the first artifact, the first artifact is not converted in the converting step;
   a history adding step of placing user identification information regarding the user that has accessed the first artifact inside the access history corresponding to the first artifact;
   and a notification step of:
      retrieving the access history corresponding to the first artifact from the storage unit on condition that the first access request received from the first user corresponding to the first business process is a first update request of the first artifact, and notifying the first user of the first business process with identification information from the retrieved access history that the first artifact is to be updated,
   wherein the history adding step adds identification information of the first business process to the access history stored in association with the first artifact on condition that the first artifact has been referred to or updated in response to the first access request;
   wherein when a second access request received from the first user corresponding to a second business process is an update request of the first artifact, then the notification step:
      sends an update notification to a first user of the second business process corresponding to a reference attribute,
   notifies the first user of the second business process with an update permission request for requesting a permission to update or create the first artifact; and
      notifies the plurality of users who formerly referred to an artifact that the artifact is to be updated;
   an outputting step of reading a second maturity index of the first artifact, and outputting the first artifact on condition the first artifact that has been completed, to a designated person on condition that the second maturity index satisfies a predetermined output condition, and outputting with the maturity index a probability that the first artifact will be modified in design;
   and outputting the access history of the first artifact to a display device.

2. The method of claim 1, wherein the notification step includes:
   a second inquiry step of sending an inquiry of the first artifact to other persons on condition that the first artifact is not stored in the storage unit; and
   a second updating step of updating the first artifact with the person that has most recently accessed the first artifact.

* * * * *